United States Patent [19]
Debnam et al.

[11] Patent Number: 5,927,862
[45] Date of Patent: Jul. 27, 1999

[54] BEARING

[76] Inventors: Carey Dean Debnam, 2319 Laurelbrook St., Raleigh, N.C. 27604; James Albert Johnson, 5900, Apt. G, Teakwood La., Plymouth, Minn. 55442

[21] Appl. No.: 08/939,356

[22] Filed: Sep. 29, 1997

[51] Int. Cl.$^6$ .................................................. F16C 35/02
[52] U.S. Cl. ........................... 384/439; 384/275; 384/296
[58] Field of Search ................................. 384/439, 428, 384/275, 276, 295, 296, 299, 300

[56] References Cited

U.S. PATENT DOCUMENTS

| | | | |
|---|---|---|---|
| 3,064,494 | 11/1962 | Brewster | 384/299 X |
| 3,186,287 | 6/1965 | Wehlau | 384/276 X |
| 3,253,480 | 5/1966 | Fernberg | 384/428 X |
| 3,372,960 | 3/1968 | Fisher | 384/439 |
| 3,438,686 | 4/1969 | Stone | 384/296 |
| 3,935,631 | 2/1976 | Doerner | 384/299 X |
| 4,308,938 | 1/1982 | Denton | 384/300 X |
| 4,756,632 | 7/1988 | Belanger | 384/439 X |

FOREIGN PATENT DOCUMENTS 1273949  7/1968  Germany .............................. 384/439

*Primary Examiner*—Thomas R. Hannon
*Attorney, Agent, or Firm*—Lynn E. Barber

[57] ABSTRACT

A shaft bearing for placement in a hole in a bracket which has three main portions, a first cylindrical portion, which is larger in diameter than the bracket hole, at a first end of the bearing, a tapered portion at a second end of the bearing, and a second cylindrical portion between the first cylindrical portion and the tapered portion. There is a central cylindrical bore extending from the first end to the second end of the bearing. The bearing also serves as a spacer in installation of a garage door and associated components.

7 Claims, 5 Drawing Sheets

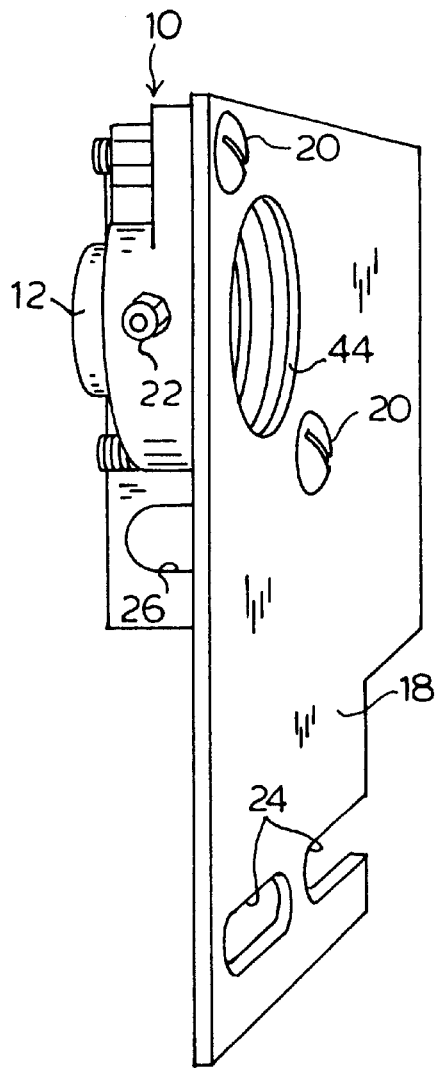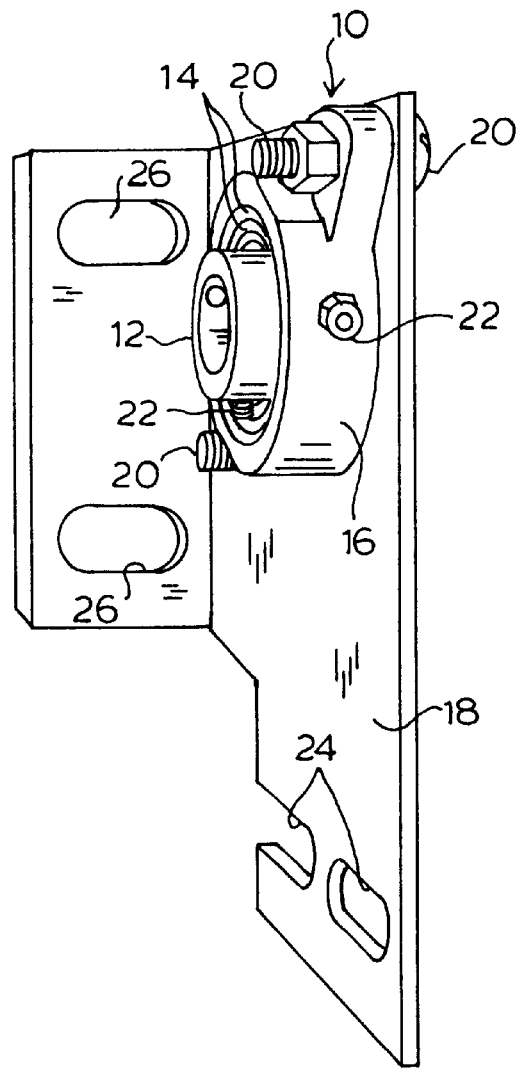
PRIOR ART
FIG. 2
PRIOR ART
FIG. 3

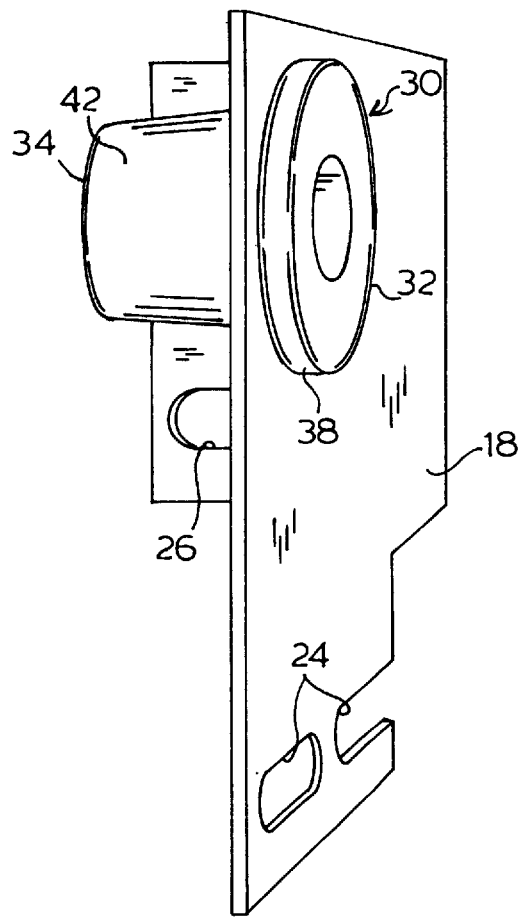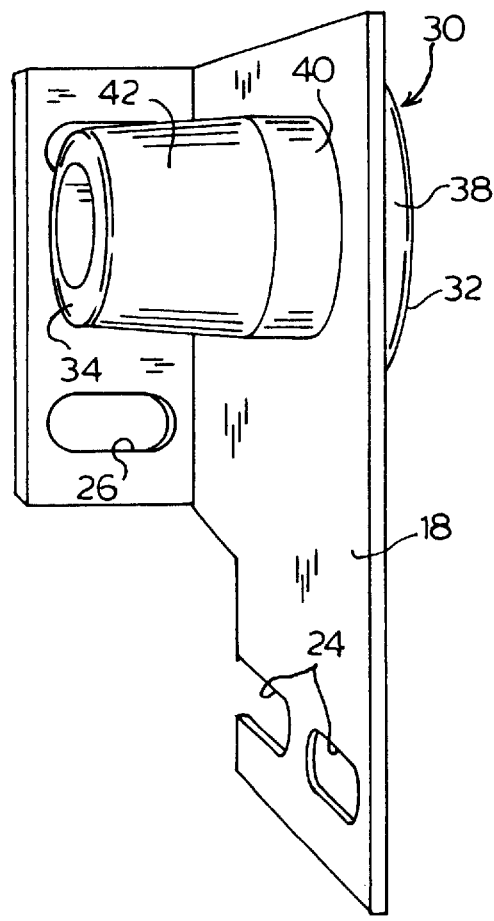
FIG. 4　　　　FIG. 5

BEARING

BACKGROUND OF THE INVENTION

1. Field of the Invention

This invention relates to bearings used on garage door assemblies for example, for garage doors used on car washes, and the like, and in particular to bearings supporting the shaft at the top of a garage door assembly adjacent the sprocket and drive train for raising and lowering the garage door.

2. Description of the Related Art

Garage doors in car washes are exposed to heavy use, constant wetting, solvents and detergents, and extremes of temperature. There is generally a bearing at each end of the shaft supporting the drive train and associated hardware at the top of the garage door.

Typical bearings used for this purpose are made of galvanized steel or mild steel. An example of a bracket 18 in which prior bearings are typically mounted is shown in FIG. 1 and has a bracket hole 44 in which to mount a bearing and two mounting holes 45 into which the bolts to hold the bearing are inserted. An example of a prior bearing 10 used for garage door shafts is shown in FIGS. 2–3. In brief, the prior bearings 10 comprise an internal bearing portion 12, mounted in successive cylindrical portions 14, the outermost of which is mounted within an attachment portion 16. The prior bearing 10 is fastened to a mounting bracket 18 by means of two bolts 20 placed through the attachment portion 16 and the bracket 18. Holes 24 in bracket 18 are for attaching the bracket to the track in which the garage door slides, and holes 26 are for attaching the bracket to a wall. Various adjustment means 22 are provided to optimize the bearing internal size. Bearings now used often have rust problems due to the constant wetting, as the mild steel rusts and/or the galvanized coating wears off the bearing. The bearings that are used in many of these roller assemblies tend to seize, particularly under the conditions of humidity and temperature present in a car wash, whether or not the bearings are sealed bearings. These bearings are also complicated to manufacture and install because of their many components.

The installation of the entire garage door must be accurate so that the door is not other than exactly vertical and so that the sprocket/drive train assembly is spaced at a sufficient distance from the door and the bearing is a sufficient distance from the pick-up drum for the cable that takes the door upward, so that when the door is raised and lowered no part of the assembly catches on another part where it should not, and so that the moving chain moves parallel to the side of the door. For this purpose, either the person doing the installation must be very careful in making measurements, or some type of spacer must be placed between the bracket which holds the bearing and both the sprocket/chain assembly and the pick-up drum.

It is therefore an object of the invention to provide a shaft bearing usable on garage doors for car washes which is rust-resistant and is in a singe piece.

It is a further object of the invention to provide a bearing which also serves as a spacer to reduce the need for exacting measurement during installation and eliminates the need for a separate spacer.

Other objects and advantages will be more fully apparent from the following disclosure and appended claims.

SUMMARY OF THE INVENTION

The invention herein is a one-piece shaft bearing for placement in a hole in a bracket around a shaft on car wash garage doors. The bearing has three main portions, a first cylindrical portion which is larger in diameter than the bracket hole at a first end of the bearing, a tapered portion at a second end of the bearing, and a second cylindrical portion between the first cylindrical portion and the tapered portion. There is a central cylindrical bore extending from the first end to the second end of the bearing. The bearing also serves as a spacer in installation of a garage door and associated components.

Other objects and features of the inventions will be more fully apparent from the following disclosure and appended claims.

BRIEF DESCRIPTION OF THE DRAWINGS

FIG. 2 is a perspective view of the right front side of a bracket on which a prior art bearing is mounted for use on the left side of a door as viewed from the inside of a building on which the door is installed.

FIG. 3 is a perspective view of the left front side of the bracket and bearing shown in FIG. 2.

FIG. 4 is a perspective view of the right front side of a bracket on which the bearing of the invention herein is mounted for use on the left side of a door as viewed from the inside of a building on which the door is installed.

FIG. 5 is a perspective view of the left front side of the bracket and bearing shown in FIG. 4.

DETAILED DESCRIPTION OF THE INVENTION AND PREFERRED EMBODIMENTS THEREOF

Figure 1:
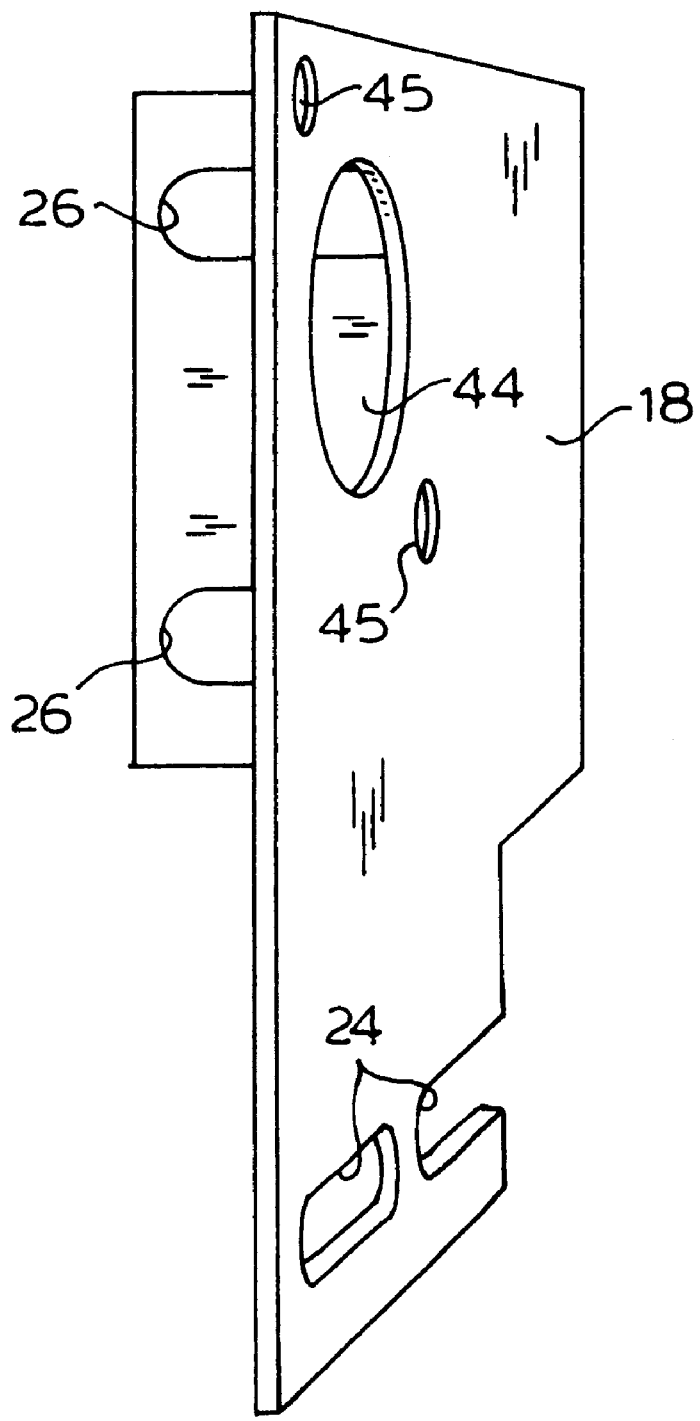
FIG. 1 is a perspective view of a prior bracket alone in which a prior bearing or a bearing of the invention may be mounted.

As shown in FIGS. 4–8, the present invention provides a shaft bearing 30 for a rotating shaft, comprising a unitary piece of a non-rusting material. The shaft bearing 30 of the invention has a first end 32 and a second end 34, and a cylindrical central bore 36 having a uniform diameter and extending through the entire bearing 30 from the first end 32 to the second end 34, for placement around the shaft. The shaft bearing 30 is mountable in a bracket hole 44 a prior bracket 18 as shown in FIGS. 4–5, or in any bracket having a hole of sufficient diameter for insertion of the bearing 30. Because bearing 30 does not require being bolted to the bracket 18, bracket holes 45 are not necessary when bearing 30 is used.

Although the shaft bearing 30 of the invention is most preferably a single, unitary piece that is preferably manufactured in one piece, it can be considered to be made of three separately describable portions that are coaxial, extending along the central bore 36, as follows. At the first end 32 there is a first cylindrical portion 38. There is a tapered portion 42 at the second end 34, and a second cylindrical portion 40 between the first cylindrical portion 38 and the tapered portion 42.

Figure 8:
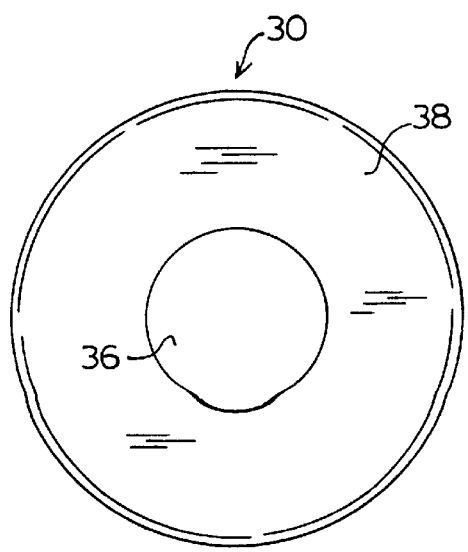
FIG. 8 is an elevational view of the first end of the bearing of the invention.

The first cylindrical portion 38 has an external diameter larger than the diameter of the bracket hole through which the bearing 30 is inserted. Both the outer edge 46 and the inner edge 48 of the first cylindrical portion 38 are preferably beveled as shown in FIG. 8. Most preferably, for a bracket hole size of about two (2.0) inches, the external diameter of the first cylindrical portion 38 is about 2.5 inches, the only necessary criteria being that the first cylindrical portion 38 is not so small as to slide through the bracket hole and not so large as to be unwieldy to handle, or to interfere with installing other parts of a garage door. Similarly, the width of the first cylindrical portion 38 (from the first end 32 of the bearing to the second cylindrical portion 40) is preferably about 0.375 inches so that it is easily handled and sturdy enough not to break. This thickness also allows the first cylindrical portion to serve as a spacer from the pick-up drum for the garage door.

The second cylindrical portion 40, which is adjacent the first cylindrical portion 38 on one side and adjacent the tapered portion 42 on the other side, has an external diameter D (FIGS. 6–7) enabling the second cylindrical portion 40 to fit snugly within the bracket hole. Thus, for a bracket having a bracket hole that has a 2-inch diameter, the diameter of the second cylindrical portion 40 is about 2.015 inches. It is preferred to have this second cylindrical portion 40 be at least about 0.375 inches wide (the distance between the first cylindrical portion 38 and the tapered portion 42) so that there can be some sideways movement of the bearing 30 in the bracket hole without the bearing conical portion 42 sliding out of the bracket hole.

Figure 6:
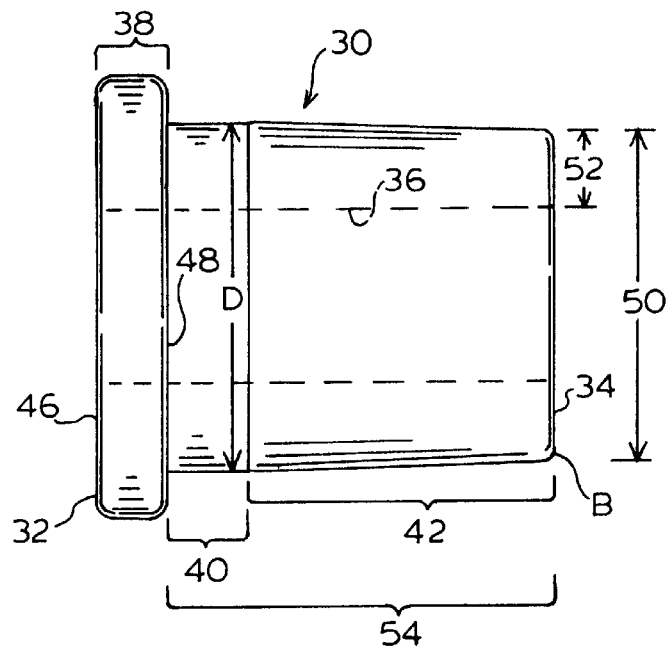
FIG. 6 is an elevational side view of the bearing of the invention.
Figure 7:
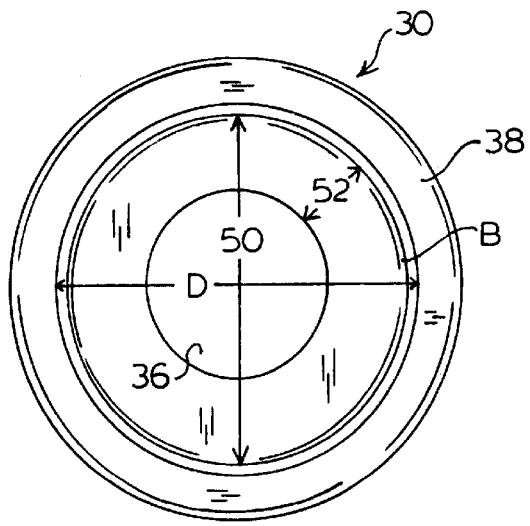
FIG. 7 is an elevational view of the second end of the bearing of the invention.

The conical portion 42 has an external diameter at the end adjacent the second cylindrical portion 40 which is the same as the external diameter of the second cylindrical portion 40, and as shown in FIG. 6 is gently tapered to a reduced external diameter 50 at the second end 34 of the bearing. The amount of this taper is just sufficient so that the second end 34 is easily insertable in the bracket hole during installation, but is not so narrow at the second end 34 so as to make the thickness of the wall 52 at the second end 34 of the bearing 30 around the central bore 36 so narrow so as to be fragile. Thus, the preferred external diameter of a 1.75 inch long conical portion 42 of the bearing for a 2-inch diameter shaft varies from about 2.015 inches at the widest end adjacent the second cylindrical portion 40, down to 1.95 inches at the narrowest end (which is at the second end 34 of the bearing). Preferably the conical section portion 42 is beveled at the second end 34 of the bearing as shown by B in FIG. 6.

Figure 9:
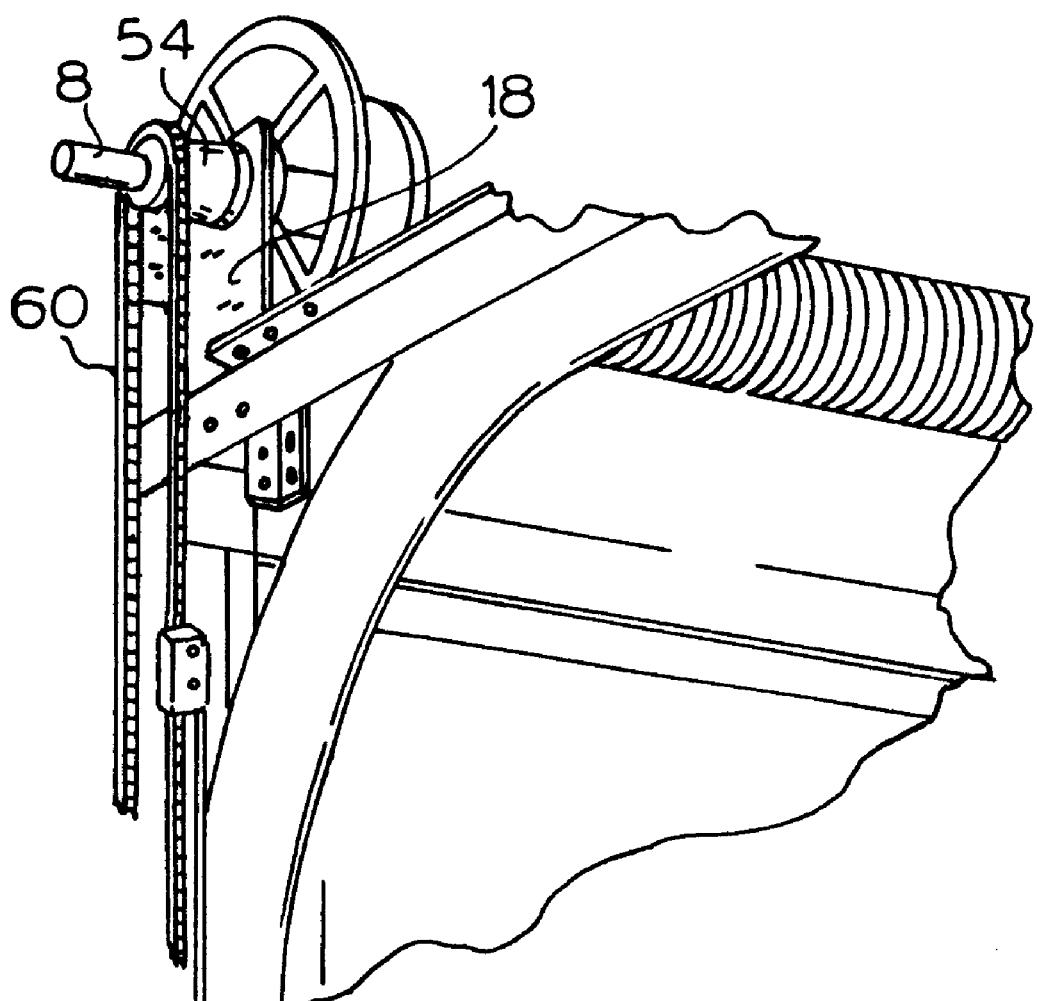
FIG. 9 a perspective view showing the bearing of the invention mounted in a bracket and serving as a spacer.

The combined length of the tapered portion 42 plus the length of the second cylindrical portion 40 forms a spacer 54 which determines the spacing capability of the bearing 30 from the sprocket/chain assembly. In other words, in the preferred embodiment made for use on car wash garage doors, where this combined length is preferably 2.125 inches, the bearing 30 is useful in spacing the other components of the garage door assembly during installation so that the drive train 60 for raising and lowering the door is just over 2.125 inches from the bracket 18, and thus is correctly aligned sufficiently far from the moving garage door parts (FIG. 9).

Preferably the bearing 30 is made in one piece of a non-rusting material, and most preferably, the bearing of the invention is made of a plastic, most preferably high density polyethylene (HDPE), due to the rigidity, hardness, high tensile strength and compressive strength of HDPE. HDPE can be injection molded for faster, more exact production than machining each roller. Injection molding also significantly reduces the amount of waste material generated from the machining process, although the invention can also be made by machining as is known in the art. Polyethylene plastics are also resistant to chemicals, have a low coefficient of friction, are abrasion and impact resistant, and do not absorb moisture. Other materials which can be injection molded and which are sufficiently hard and durable to withstand the pressures to which the bearing is to be subjected in use may also be used to form the roller. Other materials such as delrin, which are not moldable by injection, may be used if cost is not important.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A one-piece shaft bearing for a rotating shaft, comprising a first end and a second end, and having a cylindrical central bore with a uniform diameter and extending from the first end to the second end for placement around the shaft, said bearing being mountable in a circular bracket hole in a bracket, and comprising three coaxial, unitarily formed portions extending along the central bore, comprising in order from the first end to the second end, a first cylindrical portion, a second cylindrical portion and a tapered portion, wherein:

(a) the first cylindrical portion has an external diameter larger than the bracket hole;

(b) the second cylindrical portion has an external diameter enabling the second cylindrical portion to fit snugly within the bracket hole; and (c) the tapered portion has an external diameter portion adjacent the second cylindrical portion, which is the same diameter as the external diameter of the second cylindrical portion and the tapered portion is gently tapered to a reduced external diameter at the second end, wherein the bearing has dimensions enabling it to serve as a spacer when the bearing is mounted in the bracket hole.

2. The bearing according to claim 1, wherein the bearing is a unitary piece of non-rusting material.

3. The bearing according to claim 2, wherein the non-rusting material is high density polyethylene.

4. The bearing according to claim 1, wherein the first cylindrical portion has two edges which are beveled.

5. The bearing according to claim 1, wherein the first and second ends are beveled.

6. The bearing according to claim 1, wherein the second cylindrical portion and the tapered portion together serve as a spacer.

7. The bearing according to claim 1, wherein the first cylindrical portion serves as a spacer.

* * * * *